Figures 10, 11:
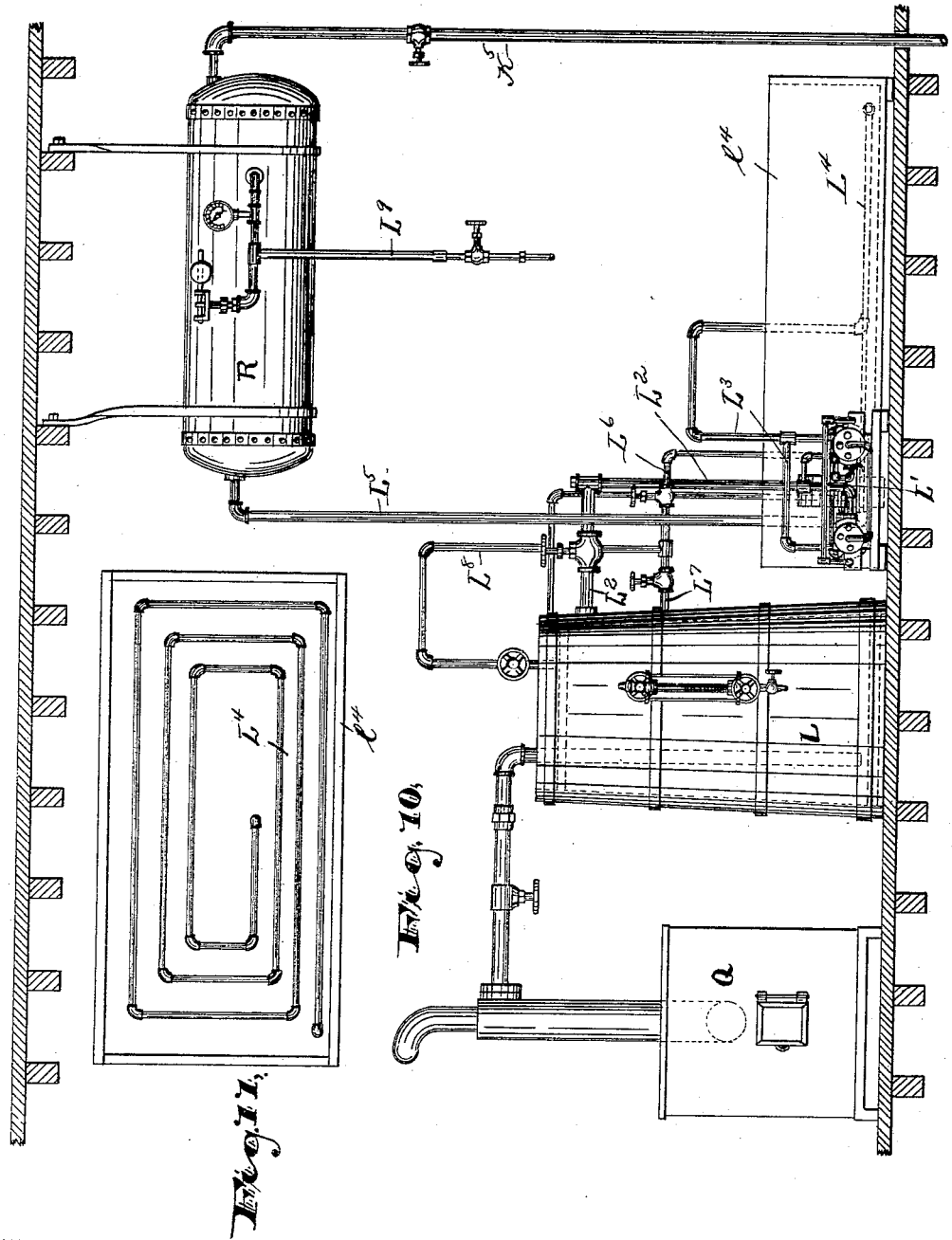

No. 618,213. Patented Jan. 24, 1899.
A. W. SOUTHARD.
ART OF CONVERTING METALLIC LEAD INTO OXIDS.
(Application filed Mar. 26, 1898.)
(No Model.) 5 Sheets—Sheet I.
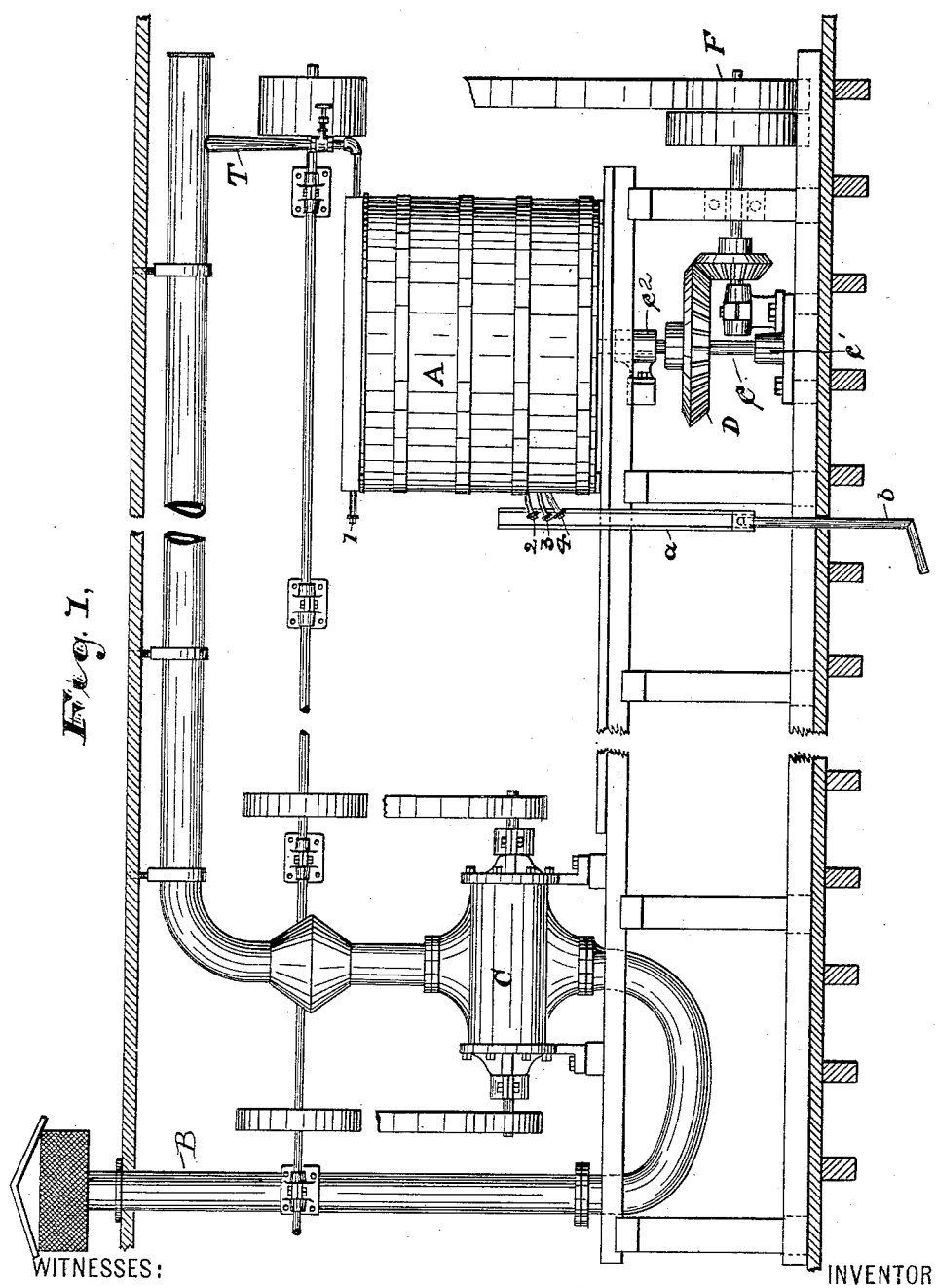
Fig. I.
WITNESSES:
A. R. Krousse.
Russell M. Everett.
INVENTOR
Albert W. Southard,
BY J. C. Clayton,
ATTORNEYS No. 618,213. Patented Jan. 24, 1899.
A. W. SOUTHARD.
ART OF CONVERTING METALLIC LEAD INTO OXIDS.
(Application filed Mar. 26, 1898.)
(No Model.) 5 Sheets—Sheet 2.
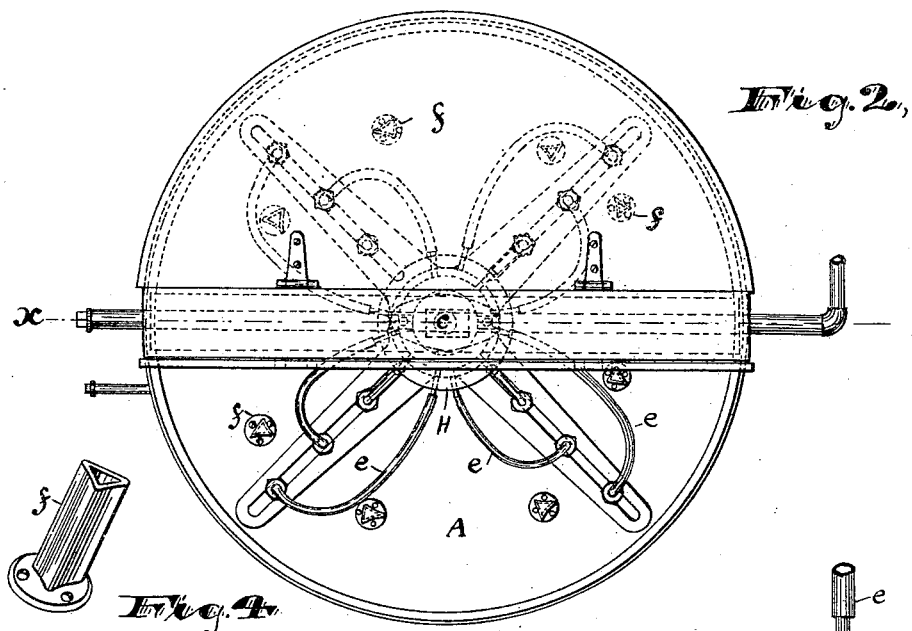
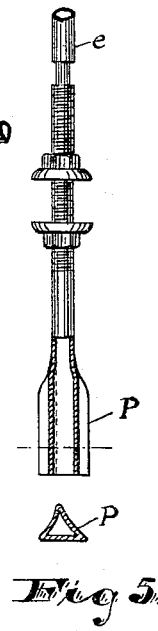
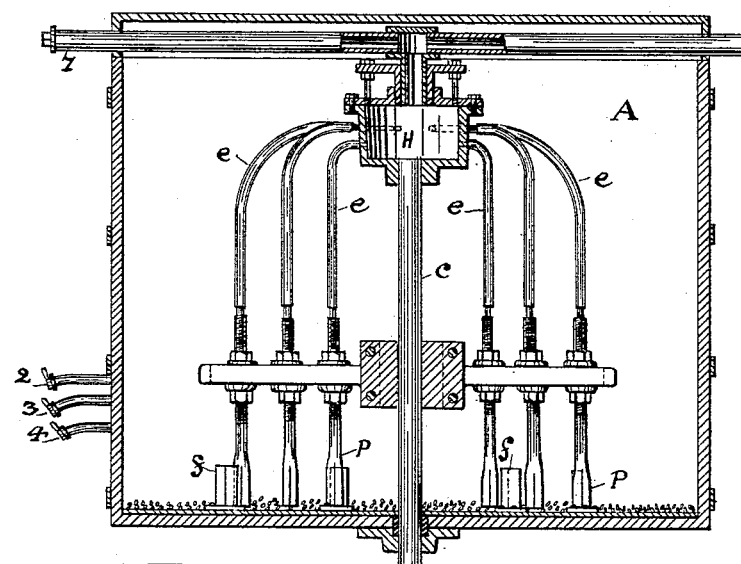
WITNESSES: INVENTOR
C. R. Krause Albert W. Southard,
Russell M. Everett BY J. C. Clayton,
ATTORNEYS No. 618,213. Patented Jan. 24, 1899.
A. W. SOUTHARD.
ART OF CONVERTING METALLIC LEAD INTO OXIDS.
(Application filed Mar. 26, 1898.)
(No Model.) 5 Sheets—Sheet 3.
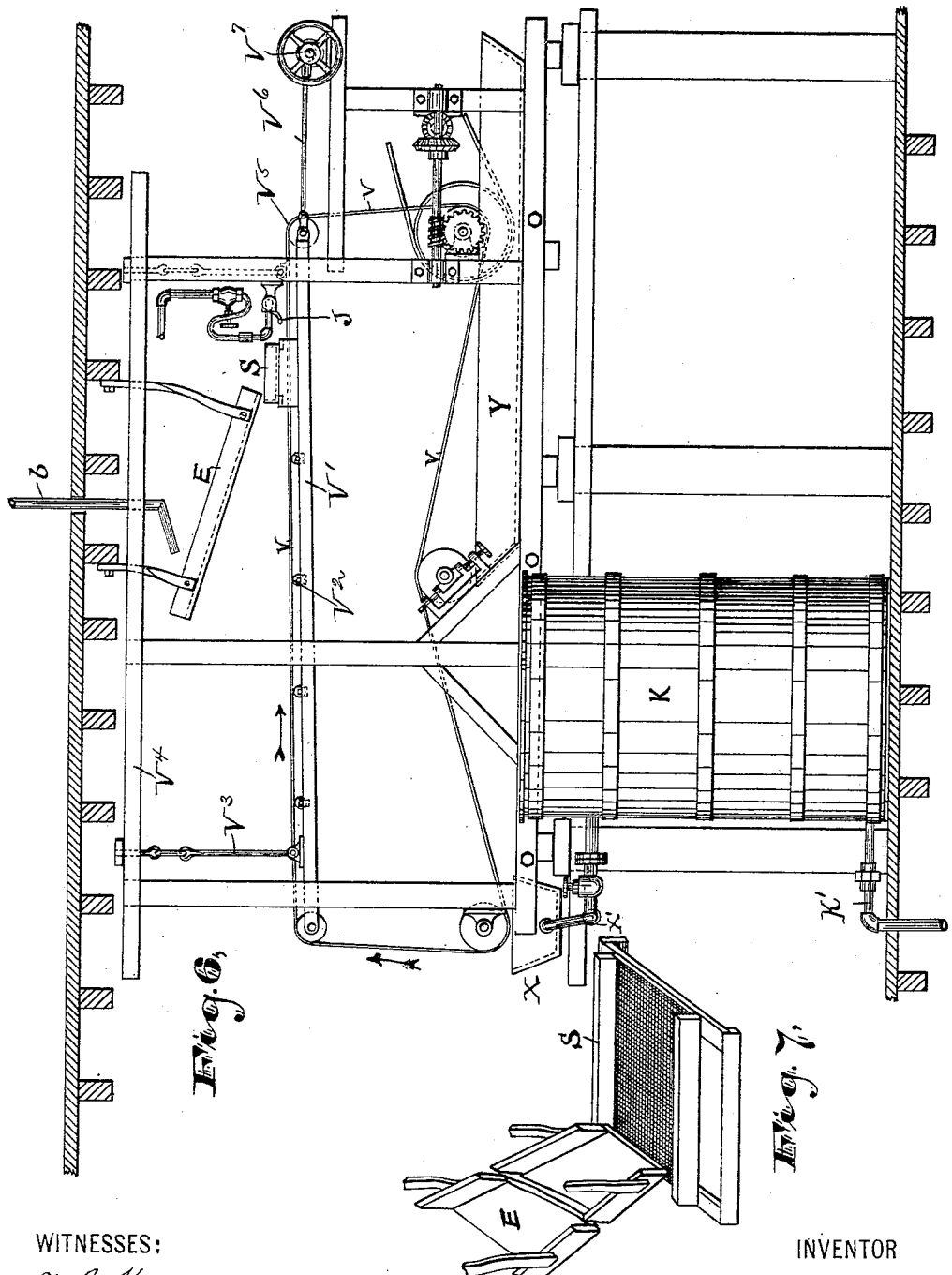
WITNESSES:
A. R. Krause
Russell M. Everett
INVENTOR
Albert W. Southard,
BY J. C. Clayton,
ATTORNEYS No. 618,213. Patented Jan. 24, 1899.
A. W. SOUTHARD.
ART OF CONVERTING METALLIC LEAD INTO OXIDS.
(Application filed Mar. 26, 1898.)
(No Model.) 5 Sheets—Sheet 4.
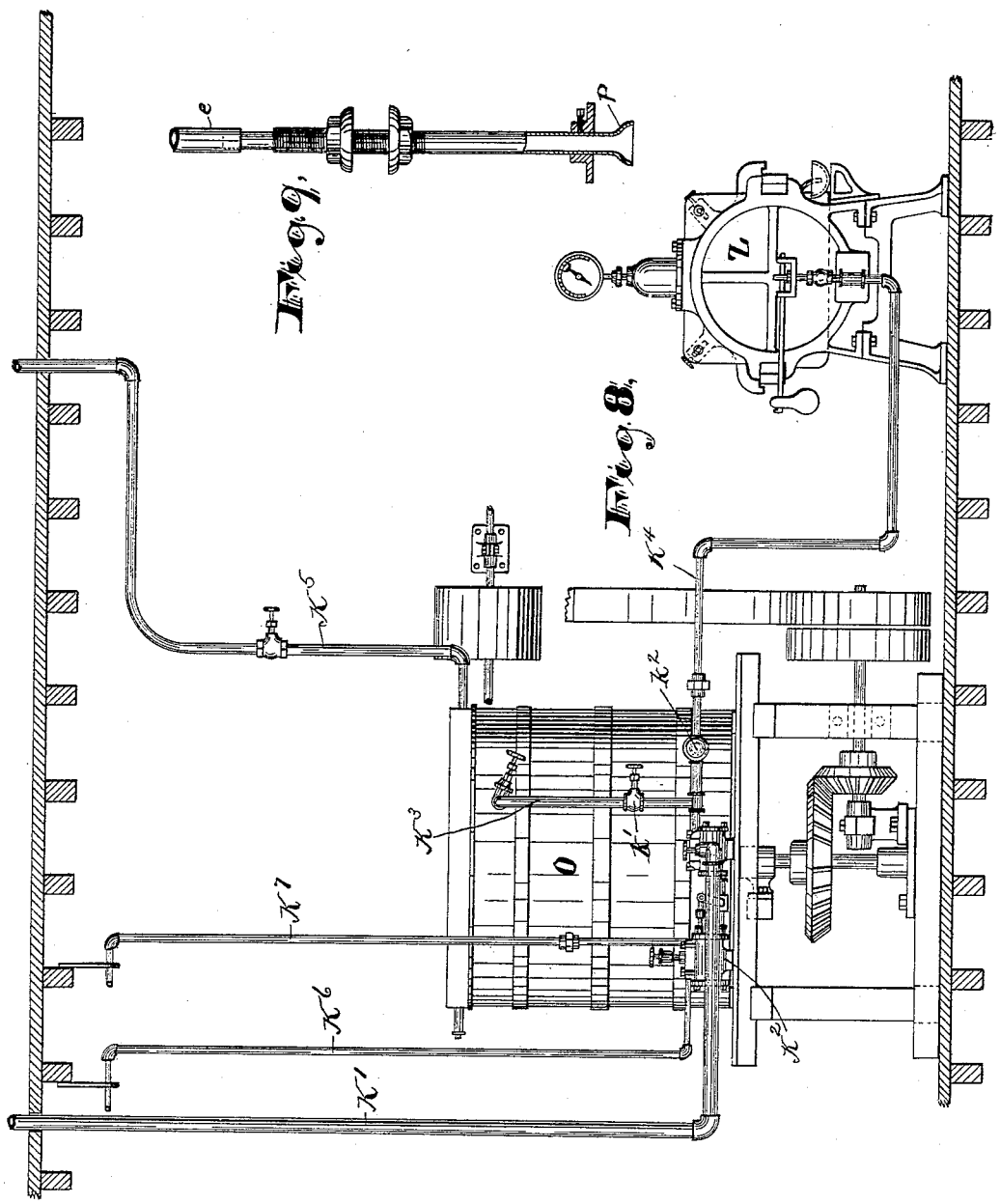
WITNESSES:
INVENTOR
Albert W. Southard,
BY J. C. Clayton,
ATTORNEYS No. 618,213. Patented Jan. 24, 1899.
A. W. SOUTHARD.
ART OF CONVERTING METALLIC LEAD INTO OXIDS.
(Application filed Mar. 26, 1898.)
(No Model.) 5 Sheets—Sheet 5.

WITNESSES:
Cl. R. Krousse
Russell M. Everett

INVENTOR
Albert W. Southard,
BY J. C. Clayton,
ATTORNEYS

UNITED STATES PATENT OFFICE.

ALBERT WILLETT SOUTHARD, OF NEWARK, NEW JERSEY, ASSIGNOR TO THE RUBBER AND CELLULOID HARNESS TRIMMING COMPANY, OF SAME PLACE.

ART OF CONVERTING METALLIC LEAD INTO OXIDS.

SPECIFICATION forming part of Letters Patent No. 618,213, dated January 24, 1899.

Application filed March 26, 1898. Serial No. 675,224. (No specimens.)

*To all whom it may concern:*

Be it known that I, ALBERT WILLETT SOUTHARD, of Newark, Essex county, in the State of New Jersey, have invented and discovered certain new and useful improvements in the art of converting metallic lead into lead oxids, including hydroxid of lead, minium or red lead, and hydrated oxycarbonate of lead or white lead, of which the following is a specification.

My invention and discovery is in the nature of improvements upon the invention for making oxid of lead described in United States Letters Patent No. 552,102, granted December 31, 1895, to the Albright White Lead Company, assignee of John W. Coghlan, and results from extended experiments with Coghlan's invention.

Previous attempts have been made by others to produce an oxid of lead, such as litharge, by grinding comminuted lead in the presence of air and water; but I am not aware that it has been undertaken previous to my invention to produce the hydroxid of lead in the manner hereinafter described, my improved process consisting, essentially, in subjecting comminuted lead to agitation in the presence of water, simultaneously forcing air into and throughout the mass, then promptly withdrawing from the oxidizing-tank a portion of the water having the impalpable powder in suspension, then separating all of the metallic lead from the hydroxid by a compound separator, and then subjecting the hydroxid to a filter-press to expel the water therefrom, whereby the material may be subsequently dried. This submission of the water having the hydroxid in suspension to the direct action of the compound separator and then to the filter-press secures an extraordinary fineness of grain, which enables the oxid produced by the action of air, water, and abrasion to take up readily its proper volume of hydrogen and become a true hydroxid, and this peculiar richness and the other qualities of the hydroxid and its exceeding fineness enable it to readily assimilate the carbon of the carbon dioxid when agitated in the carbonating-tank, and thus produce a very fine and true hydrated oxycarbonate of lead.

To enable others skilled in the art to make and practice my invention, I will proceed to describe the construction and arrangement of a plant capable of carrying out my improved process and also the method of operating it, the one hereinafter described, and illustrated in the drawings, being such as I have used in practice and found capable of producing from seven hundred to one thousand pounds of dry hydrated oxycarbonate of lead in twenty-four hours. I would have it understood, however, that I do not limit my invention to the detail construction and arrangement of parts forming the apparatus nor the proportions of materials specified, as such may be changed or varied in many instances without departing from the spirit and scope of my invention.

There are five sheets of drawings and numerous figures.

Similar letters and figures refer to like parts.

I find it convenient to use several floors of the factory, so as to discharge by gravity from one part of the apparatus to another.

Figure 1 shows the oxidizing-tank and means of supplying it with atmospheric air under pressure, which are on the top floor. Fig. 2 is a top plan view of the oxidizing-tank, showing one-half of the cover or lid open. Fig. 3 is a vertical sectional view of the same. Figs. 4 and 5 are detail views showing the construction of the beater or churning device. Fig. 6 is a side view of the compound separator and storage-tank. Fig. 7 is a detail view of one part or portion of the separator. Fig. 8 is a view in elevation of the carbonating-tank and filter-press, and Fig. 9 a detail view of one of the hollow arms for introducing gas into the said tank. Fig. 10 is a view of the apparatus for forming the carbon dioxid, and Fig. 11 the arrangement of the pipes in the cooling apparatus through which the gas passes.

A is the oxidizing-tank, which in this plant is about six feet internal diameter and about four feet deep, with a tight lid. The tank I prefer to build of wood staves hooped, and its bottom and about two feet or more of its depth is lined with copper. The tank A rests upon a platform.

In Fig. 2 half of the cover is shown hinged and open for introduction of the lead and for inspection and cleaning. Cock 1 is the inlet-cock to supply ordinary water from the river or other source. 2, 3, and 4 are outlet-cocks for drawing from the tank. They empty into an inclined sluice $a$, connected with pipe $b$, which passes down through the floor and discharges upon the table of the separating apparatus.

B is the air-intake, which is above the roof. Its sides are screened, so as to keep out dust.

C is a pump to draw in air from the intake and force it under high pressure through a tube T into the beaters of the tank.

D is the gearing under the tank, and F the driving-pulley.

Figs. 2, 3, 4, and 5 show details of the construction of the "beater" or churning device, which operates in the oxidizing-tank. This device is a beater revolving by means of its shaft $c$, driven by the gearing D. The lower end of this shaft, as shown in Fig. 1, is supported in the step-bearing $c'$, the shaft being held in its vertical position by means of the bearing $c^2$, secured to the framework. The upper end of the shaft $c$ fits in a stuffing-box and has secured thereto an air chamber or reservoir H. From this hood there extends outward and downward a number of radial tubular beaters $e$, each of which has at its lower end a hollow plow P, just clearing the bottom of the tank, so as to lift up the lead and continue its vigorous agitation. $f$ are several stationary breakers extending up from the floor of the tank. Pump C forces air through tube T into the pipe $l$, then into the chamber H, thence into the radial beaters $e$, down into and out of the hollow plows into the volume being agitated in the tank, the excess of air forced into the mass in the tank A escaping from said tank between the upper edge thereof and the cover or lid. It is a distinctive feature that the air must be forced under pressure into the mass at or near the bottom, so as to give the largest volume of its oxygen to the agitated mass.

Figs. 6 and 8 show the separating apparatus, (and also a storage-tank which may be used when convenient to store, but which is not a necessary part of the plant.) This separator is arranged on the floor below that containing the parts heretofore described. The pipe $b$ (also shown in Fig. 1) discharges the fluid from tank A upon the distributing-table E. Thence it falls into the vibrating screen S, which catches the larger bits of metal. The water and oxid and still smaller bits which pass through screen S drop upon the endless separating-belt V, which is made of rubber and has a lip at each edge. The belt is inclined slightly down toward the trough X, from which leads a pipe X' to the storage-tank (when used) or to the carbonating-tank on the floor below. The belt V travels over and around the frame V', provided with a series of rollers $V^2$, upon which latter the belt rests, said frame V' being suspended by means of the rods $V^3$, secured at their upper ends to the stationary framework $V^4$, this construction and arrangement of parts allowing the said frame V' to be moved or vibrated, as hereinafter described. As the screen S is mounted upon said frame V', it will be evident that said screen will also be moved or vibrated with said frame. In order to produce the vibrating motion of the frame V', the belt V, and also of the screen S, I secure to said frame a cam-wheel $V^5$, to which is connected the rod or shaft $V^6$, the opposite end of the latter being connected with a shaft $V^7$, motion being transmitted from the latter through the shaft $V^6$ and cam $V^5$ to the frame V'. Above the belt V are located a number of feed-jets J, discharging small jets of water upon the belt between its higher end and the screen S. In order to properly distribute the water over the belt, I prefer to give these jets a vibrating motion, which may be accomplished in many ways well known to those skilled in the art and which need not be described here in detail. As the pipe $b$ discharges the fluid from the tank A over the distributing-table E and onto the screen S the latter catches and retains the larger particles of metal, the water and oxid passing through said screen onto the belt V, which, as shown, is inclined from the front or forward end toward the rear end, said belt traveling in the same direction—that is, in a direction from its lower end toward its higher end, as shown by the indicating-arrow. As the water and oxid pass through the vibrating screen S onto the belt V the water discharged by the feed-jets J, together with the shaking or vibration of the belt, completely and perfectly separates the powdered oxid held in suspension from any heavier particles of metal which may have passed through the screen S. The heavy particles of metal adhere by gravity to the belt and are carried on and by the same rearwardly into the pan Y, located below the higher end of the belt, and through which the belt travels. The pan or tank Y is partially filled with water, which as said belt passes through it washes off any of the heavier particles of metallic lead which may be stuck or may adhere thereto. The lighter particles of oxid, thus completely separated from any metallic lead, are washed down the belt by the water issuing from the jets J and carried down the inclined belt by said water until they fall, with the latter, into the trough X, from whence, as before described, they are led through the pipe X' out into the storage-tank K or to the carbonating-tank O.

Figs. 8 and 9 illustrate the carbonating apparatus and filter-press. This part of the apparatus is arranged on the floor with the separating apparatus. O is the carbonating-tank, which is of similar construction to that of oxidizing-tank A and is provided with a similar or other suitable beating apparatus, although so great a degree of violence in agitation is not needed in this tank where carbon dioxid is commingled with the oxid in suspension in the water, as in tank A, where the abrasion of the lead pellets is an important result to be accomplished by the violent beating. Carbon dioxid, commonly called "carbonic-acid gas," is forced under high pressure by a pump into this tank through its beaters, one of which is illustrated in Fig. 9, and is agitated with the contents. From the storage-tank K the water and oxid held in suspension therein are drawn through the pipe K′ by means of the pump K² and forced through the inlet-pipe K³ into said carbonating-tank O, where, as before stated, it is commingled with the carbon dioxid, the latter being fed into the tank through the beaters from the supply-pipe K⁵. The supply-pipe K³ at its lower end is provided with a T or outlet pipe from the bottom of the carbonating-tank O and which communicates with the pipe K⁴, leading to the filter-press Z, valves or cut-offs k′ and k² being provided in order that the oxid may be pumped into the tank O or the carbonate from the tank O to the filter-press Z, as desired.

The filter-press Z may be of any desired construction or of any of the well-known styles now on the market, and hence need not be described here in detail.

Pipes K⁶ and K⁷ are respectively the steam inlet and discharge pipes to and from the pump K².

Figs. 10 and 11 illustrate that part of the plant in which the carbon dioxid is produced. Q is the furnace in which the consumption of coke and chalk evolves large quantities of carbon dioxid, which passes over into the washing-tank and thence into the receiver R, where it is forced into the carbonating-tank. This I find a good apparatus for producing the carbon dioxid; but it is only one of several methods which may be adopted.

After the carbon dioxid passes through the water in the washing-tank L it passes out through the upper end of said tank through the outlet-pipe L² to the compressor L′, constructed in the usual manner, the latter forcing it through the outlet-pipes L³ through the pipes L⁴, arranged as shown in Fig. 11—that is, in the bottom of the tank l⁴, partially filled with water for the purpose of cooling the gas—said coil of pipe L⁴ communicating with the pipe L⁵, leading to the reservoir R, from which it passes through the pipe K⁵ to the carbonating-tank O, Fig. 8, as before described, said reservoir R having an outlet-pipe L⁹, from which gas may be taken at any time for the purpose of testing the same.

L⁷ represents a water-inlet pipe for supplying the tank L with water from any suitable source, a branch pipe L⁸ extending therefrom over the cover of the tank L for the purpose of supplying water onto said cover, and thereby preventing the heated gas within the top of the tank L from burning or destroying said cover, another branch L⁶ of said water-inlet extending down into the cooling-tank l⁴ for the purpose of supplying water thereto.

The lead may be comminuted or converted into shot or pellets in any desired way—as, for instance, by passing the same in a molten condition through a sieve into a vessel of water located below the latter. However, as this step is well understood by those skilled in the art no detail description of the same is required.

I will describe the operation of my invention in producing three commercial products or "oxids," one of which I shall call "hydroxid of lead," one "minium," and the other "hydrated oxycarbonate of lead."

I first form the hydroxid and then filter-press and dry it, if it is intended to be marketed in that form. If I wish to produce the hydrated oxycarbonate, then the hydroxid while in suspension in water after separation and before it is pressed or dried is carbonated, as hereinafter described, by a continuation of the process. If I wish to produce minium or "red lead," I fuse in the usual manner either the hydroxid or the hydrated oxycarbonate.

My operations are as follows: I first charge the oxidizing-tank A with about five hundred pounds of the lead pellets and about two hundred and fifty to three hundred gallons of water at its normal temperature. At the same time atmospheric air is drawn through the screened intake B and forced at a pressure of about five pounds or more per square inch into the beaters e and out at the bottom of the plows P. Power being applied, the beaters and plows rapidly revolve and stir up and violently agitate the entire contents of the tank, striking the lead pellets against each other and the beaters and breakers and abrading or grinding their surfaces, which are slightly oxidized by the combined action of the water and the excess of atmospheric air forced into the mass. About six hours of this milling action will convert so large a percentage of the metallic lead into an impalpable hydroxid as to impart a yellow color to the fluid and add very materially to its density, and the temperature of the mass will increase by from 40° to 60°. When the color is right to the eye of the operator or the density of the water is increased, say, ten per cent. or more, I begin to draw off a portion through the cocks 2, 3, and 4 into the sluice $a\ b$ upon the table E of the separating apparatus; but it is not necessary to stop the grinding. When I have drawn off a suitable portion, I can feed in from time to time more lead and more water and make the work continuous. When the grinding in the tank A shows the proper color or density, the water therein will hold in suspension a large percentage of impalpable pure hydroxid of lead. As before described, I then permit a portion of the contents of the tank A to flow out of the tube *b* upon the table E, thence upon the vibrating screen S, and through the latter onto the inclined belt V. The water, with its contained lighter particles of impalpable hydroxid, will flow down the inclined belt into the trough or tank X, the water issuing from the jets J assisting to wash said lighter particles of the hydroxid down the belt. The heavier particles or bits of metallic lead, however, which, perchance, have passed through the screen S will by gravity remain in contact with the belt, which, as before described, travels in the direction of its ascent, thereby causing said heavier particles of metal to be carried around the rear rolls $V^3$, whereupon they will drop into the tank Y. Should any particles of metal adhere to the belt, they will of course be detached therefrom as the said belt travels through the water with which the tank Y is partially filled, as before described. From this pan or tank Y these particles of metallic lead, together with those which have remained upon the screen S, may be returned to the grinding-tank A for further grinding and oxidation.

I think that a substantial pellet like those I have described is of material aid in the process and is preferable to any other form of comminution for the grinding process. They strike against each other, as well as against the beating apparatus, the sides of the tube, and the water, and by this rapid abrasion greatly hasten the complete oxidization of their surfaces and the reduction of the resulting hydroxid to an impalpable powder, which will long remain in a state of suspension in the water.

If I intend to produce the hydroxid for the market as hydroxid of lead, the fluid that passes from the separating process is then pumped into the filter-press Z. The residue left in the press is then taken out and dried and when desired is ground. It is then salable as hydroxid of lead for various purposes in the arts. This hydroxid, and also the hydrated oxy-carbonate when properly fused produces a high grade of minium or red lead having a beautiful color. The water may be returned from the press Z and used again in tank A, as it will contain some of the hydroxid.

When I intend to produce the hydrated-oxycarbonate of lead, (commonly called "white lead,") the process is the same up to and including the use of the separating apparatus; but having done that the water from tank A, having the hydroxid in suspension, is fed into the carbonating-tank O instead of into the filter-press. In this tank O the carbon dioxid, which is forced in through the beaters at a light pressure, supplies to the impalpable molecules of hydroxid molecules of carbon, and in the course of some six hours the hydroxid of lead is converted into hydrated oxycarbonate of lead. The contents of this tank O become of a pure whiteness and of considerable density. Indeed, too long continued grinding will make it too thick. When the contents show the desired color or density, (about ten per cent. increased density,) I am ready to filter and dry. A force-pump $K^2$ then draws off the carbonated fluid and forces it into the filter-press. Thence the residue is taken out in cakes of stiff damp hydrated oxy-carbonate of lead and is ready for the drying-room, after which it may be dried or mixed with oil. The carbonated fluid from the press may be also reused in tank A.

It will be noticed that throughout the processes described no acid is used, that no metallic lead is left in the products, that each entire process is conducted in or under water, and that these circumstances secure a remarkable degree of fineness and purity and freedom from dirt or taint of other bodies, and the fact that the lead is worked under water greatly lessens the danger of lead-poisoning to the operatives is of importance; also, that the process of making either the hydroxid or carbonate is a continuous process that may be carried on without cessation.

I believe that the hydroxid produced as above described differs from any lead oxid heretofore produced and that its exceeding atomic fineness specially fits it to take up atoms of carbon when it is subjected while in watery suspension to the action of carbon dioxid under pressure and moderate agitation. The hydrated oxycarbonate produced also appears to possess some distinctive qualities. It is free from any acid. It is strictly amorphous and non-crystallizable, is exceedingly fine in texture and of great opacity and purity of color, and its fineness of grain enables it to remain in suspension when ground in oil a comparatively long time. It is in point of fact a flour of lead, and I know of no other process by which it can be produced. There is none on the market.

I understand that in the Coghlan patent it is stated that the first tank partially oxidizes the lead and that it is necessary to put the contents drawn from this first tank into a second tank and there repeat the procedure of the first tank. I have discovered that a better and much quicker and cheaper process is to use only the first oxidizing-tank and to continuously draw from it as soon as the proper color or density is reached into the separating device and thence go from the separator directly to the filter-press, if I wish to produce the hydroxid for the market, or directly to the carbonating-tank, if I wish to produce the hydrated oxycarbonate of lead.

The several features of my invention or discovery are all related to the art of converting metallic lead into oxids and it is believed may be included in one patent for all these improvements in that art.

What I claim as new, and desire to secure by Letters Patent, is—

1. The process herein described for converting metallic lead into a hydroxid, consisting in first agitating in a suitable vessel, metallic lead in a comminuted form in the presence of water, and simultaneously introducing air into and throughout the mass; secondly, withdrawing a portion of the mass and agitating the same for the purpose of separating the lighter hydroxid from the heavier metallic lead by gravity, and thirdly compressing the hydroxid for expelling the water therefrom.

2. The herein-described process for converting metallic lead into a hydroxid, consisting in first agitating in a suitable vessel, metallic lead in a comminuted form in the presence of water and simultaneously introducing air into and throughout the mass, and secondly, withdrawing a portion of the mass onto a suitable receptacle and agitating and simultaneously spraying the same with water for the purpose of separating the lighter hydroxid from the heavier metallic lead by gravity and conveying said lighter hydroxid and metallic lead to opposite ends of said receptacle.

ALBERT WILLETT SOUTHARD.

Witnesses:
ABRAHAM MANNERS,
J. C. CLAYTON.